(12) United States Patent
Oulahal

(10) Patent No.: US 8,316,419 B2
(45) Date of Patent: Nov. 20, 2012

(54) SYSTEM FOR CONTROLLED ACCESS TO INFORMATION CONTAINED IN A TERMINAL

(75) Inventor: Rachid Oulahal, Toulouse (FR)

(73) Assignee: France Telecom, Paris (FR)

( * ) Notice: Subject to any disclaimer, the term of this patent is extended or adjusted under 35 U.S.C. 154(b) by 1309 days.

(21) Appl. No.: 11/632,009

(22) PCT Filed: Jun. 24, 2005

(86) PCT No.: PCT/FR2005/001614
§ 371 (c)(1),
(2), (4) Date: Sep. 28, 2007

(87) PCT Pub. No.: WO2006/016025
PCT Pub. Date: Feb. 16, 2006

(65) Prior Publication Data
US 2008/0046979 A1 Feb. 21, 2008

(30) Foreign Application Priority Data

Jul. 9, 2004 (FR) .................................. 04 51484

(51) Int. Cl.
*G06F 21/00* (2006.01)
(52) U.S. Cl. .......................................................... 726/4
(58) Field of Classification Search ........................ 726/4
See application file for complete search history.

(56) References Cited

U.S. PATENT DOCUMENTS

| | | | |
|---|---|---|---|
| 6,236,996 B1 * | 5/2001 | Bapat et al. ............................ 1/1 |
| 6,757,708 B1 * | 6/2004 | Craig et al. .................... 709/203 |
| 7,340,438 B2 * | 3/2008 | Nordman et al. ............... 705/64 |
| 2003/0078053 A1 | 4/2003 | Abtin | |
| 2004/0172558 A1 * | 9/2004 | Callahan et al. ............... 713/201 |
| 2004/0203845 A1 * | 10/2004 | Lal ............................... 455/456.1 |
| 2005/0282557 A1 * | 12/2005 | Mikko et al. ................ 455/456.1 |
| 2008/0301790 A1 * | 12/2008 | Halasz et al. ....................... 726/6 |

FOREIGN PATENT DOCUMENTS

| | | |
|---|---|---|
| EP | 1 193 587 A | 4/2002 |
| GB | 2 353 919 A | 3/2001 |
| WO | WO 98/52379 A | 11/1998 |
| WO | WO 02/19598 * | 3/2002 |
| WO | WO 02/099556 A | 12/2002 |
| WO | WO 03/030571 A | 4/2003 |
| WO | WO 03/058994 A | 7/2003 |

OTHER PUBLICATIONS

3GPP TS 23.271 V6.7.0 (Mar. 2004) Technical Specification 3rd Generation Partnership Project; Technical Specification Group Services and System Aspects; Functional stage 2 description of Location Services (LCS) (Release 6).*

* cited by examiner

*Primary Examiner* — Farid Homayounmehr
*Assistant Examiner* — Lisa Lewis
(74) *Attorney, Agent, or Firm* — Cozen O'Connor

(57) ABSTRACT

A system for controlled access to information contained in a terminal (10) of a user of a telecommunications network (R). The system includes, in the terminal (10), an information server (11) adapted to supply said information; and in the network (R), a privacy server (20) in which conditions for access to said information defined by the user in said privacy server (20) are stored. The system further comprises a security module (12) in the terminal (10) adapted to receive said access conditions from the privacy server (20) at the time of a request to access said information. Application to mobile telephone networks.

14 Claims, 1 Drawing Sheet

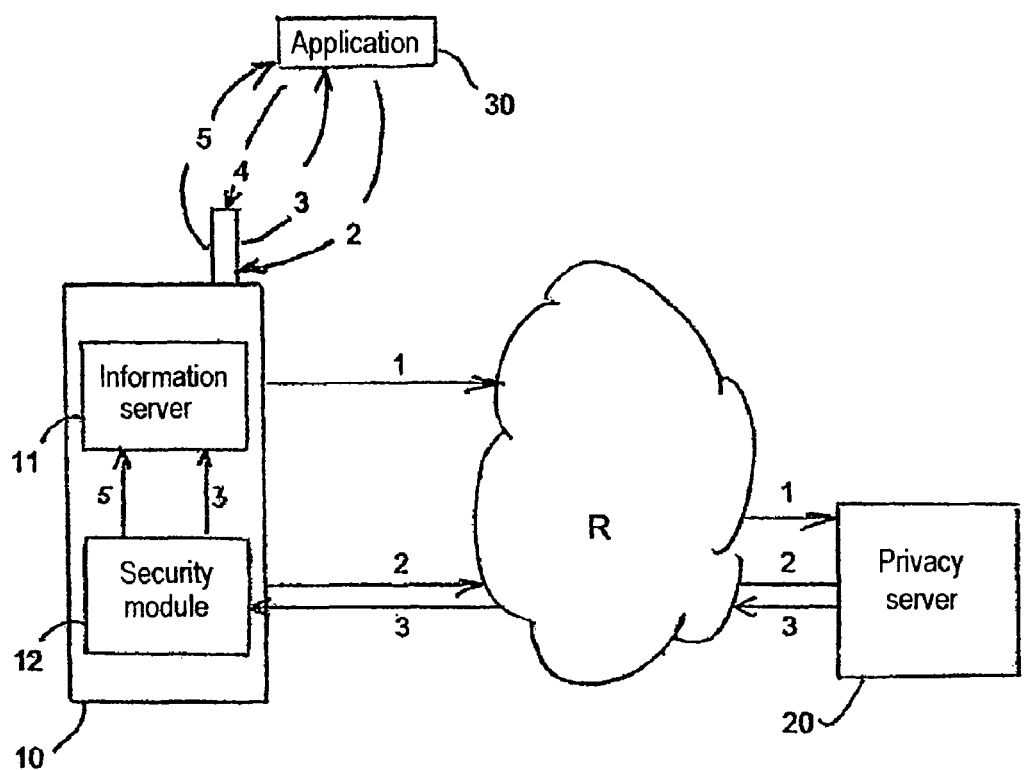

SYSTEM FOR CONTROLLED ACCESS TO INFORMATION CONTAINED IN A TERMINAL

RELATED APPLICATIONS

This is a U.S. National Phase Application under 35 USC 371 of International Application PCT/FR2005/001614 filed on Jun. 24, 2005.

FIELD OF THE INVENTION

The present invention relates to a system for controlled access to information contained in a terminal of a user of a telecommunications network. It also relates to a terminal containing controlled access information and to a privacy server of a telecommunications network.

The invention finds a particularly advantageous application in the field of mobile telephony.

BACKGROUND OF THE INVENTION

At present, mobile terminals can contain information over which users wish to be able to control access in order to limit the distribution thereof. This information is usually of a personal kind as it generally concerns the private life of the user.

Information to which access is liable to be subject to control includes the geographical location of the terminal and the user's availability or indeed contacts list.

In the remainder of this specification, the invention is described with reference to controlling access to the geographical location of the terminal. Of course, this choice is not limiting on the invention, which naturally extends to any other type of information contained in the terminal that the user intends to subject to control.

At present there are several approaches to locating a mobile terminal in the telecommunications network.

A first approach is to locate the terminal by identifying the cell in which it is situated. The resulting location is relatively coarse but may be refined by triangulation using a plurality of adjacent cells.

A second approach is to equip the terminal with a satellite positioning system such as the GPS (Global Positioning System). The terminal is then located relative to a plurality of satellites and not relative to the telecommunications network itself. That positioning system is accurate but costly to implement.

The third approach is a hybrid approach that consists of GPS location that is assisted by the network in the sense that, to accelerate the GPS location process, the GPS system of the terminal receives information concerning its approximate position from the network.

Of course, the invention is not limited to any one of these three approaches and extends equally to any other positioning technology.

The standards relating to locating the users of mobile telephone networks recommend that the agreement of the person to be located should be verified first, before supplying this location information to a third party requesting it. The expression "third party" may refer to an application, an individual, or a body corporate, etc. needing to know the geographical location of the user, for example a service for supplying a list of places (restaurants, cinemas, etc.) near the user's location.

The specification 3GPP-TS 23.271 version 6.7.0 release 6 is one example of a standard that defines a model architecture for managing information impacting on the private lives of users, and in particular their geographical locations if established by the telecommunications network itself, using the first above-mentioned approach to location.

In essence, the above standard provides for the presence in the network of a privacy server in which are stored conditions for access to said information that are defined in said privacy server by the user. This server is also called a privacy profile register (PPR).

The expression "access conditions" refers equally to authorization to access all or some of said information and to ways of accessing some or all of that information when access is authorized.

According to the above 3GPP standard, when an application requests the location server in the network to supply it with the location of a user, the server verifies that the application is authorized to access the information. It bases this verification on the access conditions that the user has previously defined in the privacy server. If the application is in fact authorized to know the location of the user, then the location server actually determines the user's location and communicates the result to the application that has requested it.

However, apart from the situation that has just been described relating to the 3GPP standard and in which the information server (here the location server) and the privacy server are situated in the network, there are situations in which, at the initiative of the manufacturer, equivalent servers are installed in the terminal itself. This situation is referred to above for the location server and in relation to the second and third approaches to location, which are at least partly implemented in the terminal. This also applies to the privacy server, which may be integrated into the terminal from the outset.

However, that so-called integrated solution runs the risk of inconsistency from one terminal to another, because the level of the information access conditions may vary according to the manufacturer.

Moreover, the coexistence, in the network and in the terminals, of two different and independent systems for controlling access to certain information has numerous drawbacks.

First of all, it should be pointed out that the user must manage two independent databases, each corresponding to one or the other of the privacy servers, which presupposes duplicate entries of access conditions.

Thus if the user modifies an access condition in a terminal, the modification is not taken into account in the network, and vice-versa. This results in a lack of uniformity in terms of quality of service. For example, if a user has declared on the network that he does not wish to receive local advertising messages but has omitted to declare this in his terminal, he will nevertheless receive messages of this type from applications that have access to his location via the terminal.

Finally, from the point of view of the operator, there arises the problem of its liability, which could be invoked even if it is not part of the service chain, i.e. if managing access to the information is a matter for the terminal only.

SUMMARY OF THE INVENTION

One aspect of the present invention is directed to a system for controlled access to information contained in a terminal of a user of a telecommunications network, comprising:
  in the terminal, an information server adapted to supply said information; and
  in the network, a privacy server in which conditions for access to said information defined by the user in said privacy server are stored;
which system would centralize access conditions in a single database to avoid duplicate entry of said conditions and to ensure a homogeneous service.

The system further comprises a security module in the terminal adapted to receive said access conditions from the privacy server at the time of a request to access said information.

Accordingly, as emerges in detail below, the conditions for access to the information are centralized in a single database, namely that of the privacy server of the network. To define these conditions, the user communicates with the operator of the network by the most appropriate means. This might include an SMS type short message, a web or WAP page or a GPRS type data connection, or even be part of the subscription process. There is therefore no necessity to duplicate this access control information once it has been supplied to the privacy server of the network.

Moreover, the service is uniform overall because it is independent of differences between manufacturers with regard to the level of privacy integrated into the terminal.

It should also be noted that the controlled access system according to an embodiment of the invention is particularly well optimized because, following a first access request from an application, the access conditions associated with that application are transferred to the security module of the terminal which then manages subsequent access requests, for as long as said access conditions remain valid, which avoids necessarily consulting the privacy server of the network on each access request, and therefore avoids overloading the network.

The privacy server can be adapted to update the security module automatically at the time of a modification of said access conditions. Preferential synchronization of the security module of the terminal to the privacy server of the network is obtained in this way.

The security module can receive the access conditions exclusively at the time of a first access request or at the time of modification of said conditions by the user.

Finally, a user terminal of a telecommunications network containing controlled access information is noteworthy in particular in that said terminal includes a security module adapted to receive conditions for access to said information from a privacy server of said network at the time of a first request for access to said information.

Similarly, a privacy server of a telecommunications network is noteworthy in particular in that it is adapted to supply to a security module of a user terminal of said network containing controlled access information conditions for access to said information at the time of a first request to access said information.

BRIEF DESCRIPTION OF THE ONLY DRAWING

FIG. 1 is a diagram of a system according to the invention for controlled access to information.

DETAILED DESCRIPTION OF THE ONLY DRAWING

FIG. 1 represents a system for controlled access to information that can be supplied by an information server 11 of a terminal 10 of a user of a telecommunications network R, such as a mobile telephone network. The information contained in the server 11 may relate to the geographical location of the terminal 10 or the contacts list or availability of the user, and more generally may consist of any information access to which by third parties, in particular by applications 30 that require to know some or all of this information, the user wishes to be able to control. Note that this application may be a remote application or one implemented directly in the terminal 10.

In a first step identified by the arrows 1 in FIG. 1, the user informs a privacy server 20 in the network R of the conditions that the user intends to impose on third parties in the event of a request to access certain information contained in the server 11. The ergonomics of this access to the privacy server 20 from the terminal 10 may be of any kind and will generally take the form of a blank form to be filled in (web page, SMS message, GPRS message, etc.).

The access conditions for each third party or application consist, firstly, of an authorization to access some or all of the information and, secondly, of ways of accessing the information if access is authorized. In the case of location information, for example, the ways of accessing the information may be as follows (this list is not limiting on the invention):
  the total number of successive locations authorized;
  the time during which location may be effected;
  the accuracy of location (e.g. better than 100 m);
  the authorized location time period;
  the authorized location place, etc.

Then, at the time of a first request from a third party or application 30 to access information in the server 11, represented by the arrows 2 in FIG. 1, the terminal 10 forwards the request to the privacy server 20. In return, as indicated by the arrows 3 in FIG. 1, the server 20 informs the terminal 10 of the access conditions relating to the application 30 that originated the request. Those conditions are stored in a security module 12 of the terminal 10.

Thus, at the time of a subsequent access request, indicated by the arrow 4, the terminal 10 interrogates the security module 12 directly and locally to find out the access conditions for this request without having to consult the privacy server 20 on the network R again. Provided that the access conditions continue to be verified, the terminal then responds appropriately to the access request (arrows 5).

Of course, the user can at any time modify the access conditions initially imposed on some particular third party or application. To this end, the user contacts the privacy server 20 again, using the same ergonomics as before, and communicates to it the new access conditions. The security module 12 is updated or synchronized automatically and immediately by the server 20 ready for a new access request.

If the access request emanates from an application for which no access condition has been stored in the privacy server 20, the server can then send the user a blank form for defining the conditions that the user intends to impose on that application.

There is also provision for the user to be able to prohibit access directly on the terminal if so desired. A simple interface in the terminal 10 then enables the user to block access by the application to the information contained in the server 11. Likewise, this simple interface in the terminal should allow restricted modification of the access conditions by the user. In this case, synchronization with the privacy server 20 will be triggered.

The privacy server 20 will preferably keep a record of the communication of access conditions to the security module 12.

The invention claimed is:
1. A system for controlled access to information contained in a terminal of a user of a telecommunications network, comprising:
  in the terminal, an information server adapted to supply the information; and in the network, a privacy server which stores access conditions for the information supplied by the information server, the access conditions being defined by the user in the privacy server;

wherein the system further comprises a security module in the terminal adapted to receive the access conditions from the privacy server at the time of a first access request, generated by the terminal, for the information supplied by the information server, the security module comprising a processor, wherein the privacy server informs the terminal of the access conditions in response to the first access request, generated by the terminal, for the information supplied by the information server, and the security module informs the terminal of the access conditions in response to subsequent access requests, generated by the terminal, for the information supplied by the information server, and the security module manages the subsequent access requests, generated by the terminal, for the information supplied by the information server for as long as the access conditions remain valid.

2. The system according to claim 1, wherein the privacy server is adapted to update the security module automatically at the time of a modification of the access conditions.

3. The system according to claim 1, wherein the security module receives the access conditions exclusively at the time of the first access request or at the time of modification of the access conditions by the user.

4. The system according to claim 1, wherein the access conditions include authorization of access to some or all of the information.

5. The system according to claim 1, wherein the access conditions include ways of accessing some or all of the information.

6. The system according to claim 1, wherein the access conditions in the privacy server are defined and modified over the network from the terminal via communications means, involving synchronization with the privacy server.

7. The system according to claim 1, wherein the terminal has an interface for direct prohibition of access to the information.

8. The system according to claim 7, wherein the interface is also an interface for modifying the access conditions, involving synchronization with the privacy server.

9. A user terminal of a telecommunications network, containing controlled access information, wherein the terminal includes a security module adapted to receive access conditions for the information from a privacy server of the network at the time of a first access request, generated by the terminal, for the information, the security module comprising a processor, wherein the privacy server stores the access conditions for the information, the access conditions being defined by the user in the privacy server, and wherein the privacy server informs the terminal of the access conditions in response to the first access request generated by the terminal, and the security module informs the terminal of the access conditions in response to subsequent access requests, generated by the terminal, for the information, and the security module manages the subsequent access requests, generated by the terminal, for the information for as long as the access conditions remain valid.

10. The terminal according to claim 9, wherein the terminal includes an interface for prohibiting access to the information.

11. The terminal according to claim 10, wherein the interface is also an interface for modifying the access conditions, involving synchronization with the privacy server.

12. A privacy server of a telecommunications network, the privacy server storing access conditions for information stored in a terminal of a user of the network, the access conditions being defined by the user in the privacy server, wherein the privacy server is adapted to supply to a security module of the user terminal the access conditions for the information at the time of a first access request for the information generated by the terminal, the security module comprising a processor, wherein the privacy server informs the terminal of the access conditions in response to the first access request generated by the terminal, and the security module informs the terminal of the access conditions in response to subsequent access requests generated by the terminal for the information, and the security module manages the subsequent access requests, generated by the terminal, for the information for as long as the access conditions remain valid.

13. The privacy server according to claim 12, wherein the privacy server contains a record of the communication of access conditions to the security module.

14. A method for controlling access to information contained in a terminal of a user of a telecommunications network, the terminal comprising an information server adapted to supply the information, the method comprising:

storing, in a privacy server of the network, access conditions for the information supplied by the information server, the access conditions being defined by the user in the privacy server; and receiving the access conditions from the privacy server in a security module of the terminal at the time of a first access request, generated by the terminal, for the information supplied by the information server, the security module comprising a processor, wherein the privacy server informs the terminal of the access conditions in response to the first access request, generated by the terminal, and the security module informs the terminal of the access conditions in response to subsequent access requests, generated by the terminal, for the information supplied by the information server, and the security module manages the subsequent access requests, generated by the terminal, for the information supplied by the information server for as long as the access conditions remain valid.

* * * * *